Dec. 13, 1927.　　　　　　　　　　　　　　1,652,346
G. A. BURNHAM
MULTIPHASE THERMALLY ACTUATED CIRCUIT CONTROLLER
Filed May 21, 1924

Inventor.
George A. Burnham
by
atty

Patented Dec. 13, 1927.

1,652,346

UNITED STATES PATENT OFFICE.

GEORGE A. BURNHAM, OF SAUGUS, MASSACHUSETTS, ASSIGNOR, BY MESNE ASSIGNMENTS, TO CONDIT ELECTRICAL MANUFACTURING CORPORATION, OF BOSTON, MASSACHUSETTS, A CORPORATION OF MASSACHUSETTS.

MULTIPHASE THERMALLY-ACTUATED CIRCUIT CONTROLLER.

Application filed May 21, 1924. Serial No. 714,977.

This invention relates to multi-phase circuit protection and has for its object the provision of a single thermally-actuated circuit-controller arranged to be heated by means of the current in the phases of the circuit, to protect the circuit.

Figure 1:
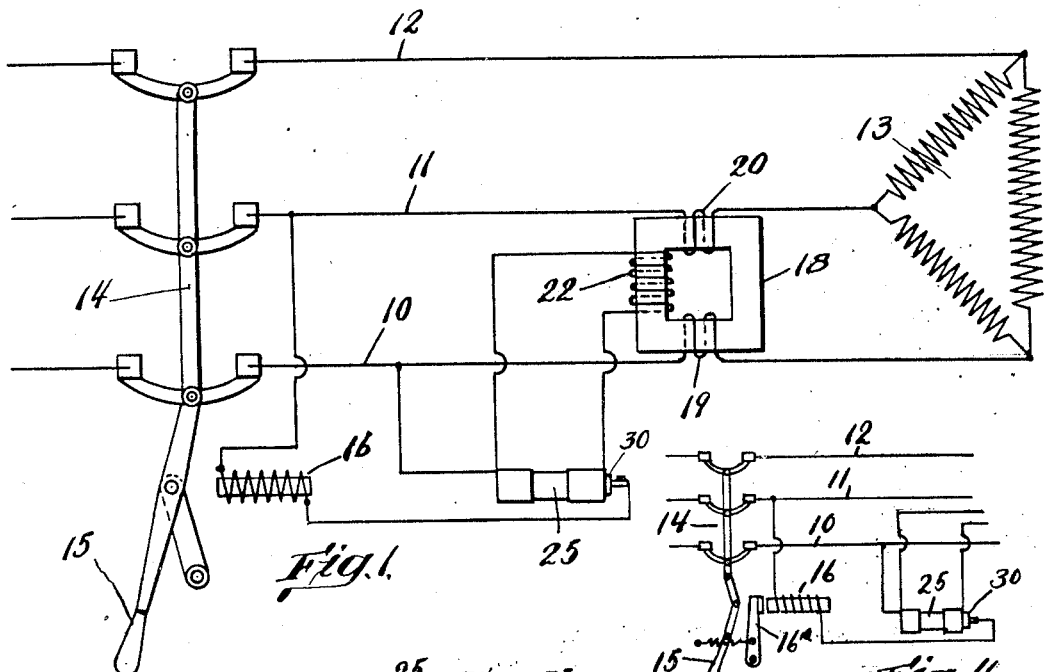
Fig. 1 is a diagram of the invention and the circuit-connections therefor.

As here shown the multi-phase circuit with which this invention may be associated may be a three-phase circuit having the three circuit leads 10, 11, and 12 and adapted for connection with a power-consuming device as the electric motor 13. A three-phase electric switch 14 may be arranged in said circuit leads and may have the handle 15 by which it may be closed and opened manually, and the trip coil 16 by which it may be opened electrically.

The circuit protective apparatus embodying the invention includes the transformer having the rectangular core 18 and the two series coils or windings 19 and 20 thereon, which coils are adapted to be connected in series with separate circuit leads and, consequently are energized by currents in different phases of the circuit. As here shown, the coil 19 is in series with the lead 10, and the coil 20 is in series with the lead 11. For circuits different from the three-phase circuit shown, there is adapted to be such a number of coils, each in a different lead and consequently, phase, of the circuit, that the resultant magnetic flux in the core 18 is affected by a current change in each phase of the circuit.

A single heating coil 22 is disposed about one of the legs of the core 18 and is adapted to be influenced, through said core, by the current in the coils 19 and 20 and to have a current generated therein which is a function of the current in said coils. Said heating coil may have but a relatively few turns as compared with the number of turns in said coils 19 and 20. Said heating coil is adapted to govern the operation of a thermally-actuated circuit-controller 25. Said circuit-controller may be constructed as set forth in a co-pending application of George W. O'Keeffe, Serial No. 557,054, filed April 28, 1922, (now Patent No. 1,574,508) and assigned to Sears B. Condit. Said controller may have the tubular insulating casing 26 provided with conducting end-caps 27 and 28 and an insulating plug 29 contained in one end of the casing under the end cap 28; and said plug may have an extension 30 projected through said end cap. A heater element 31 may extend through the casing 26 between and be electrically connected with said end caps. A spiral thermostatic element 32, comprising a strip having two united metals of different coefficients of expansion, may have one end mechanically fixed to and electrically connected with the end cap 27 and may surround and be maintained spaced from but in the field of heat-influence of the heater element 31. The free end of said thermostatic element may have a contact 34, which contact may cooperate with a fixed contact 35 to control the circuit including the trip coil 16. Said fixed contact 35 may extend through the insulating plug 29 and its extension 30 and terminate in an external terminal-portion 35ª. Said circuit controller may be supported removably in spring clips 37 and 38 which clips are secured to a suitable base 39 and are adapted electrically to engage the end caps 27 and 28.

The terminals of the heating coil 22 are connected to the clips or terminal members 37 and 38 and thence, through the end caps 27 and 28, to the heater element 31. Power to actuate the trip coil 16 may be derived from any phase of the three-phase circuit as from the phase having the circuit leads 10 and 11. Lead 10 may be connected to the clip 37, for instance, and lead 11 may be connected, through the trip coil, with the contact 35.

The contacts 34 and 35 of the circuit controller may be normally open but may close to energize the trip coil.

As thus arranged, the flux set up by the current in coils 19 and 20 may be insufficient to generate enough current in heating coil 22 to heat the heating element 31 sufficiently to move the thermostatic element 32 and close the circuit. When, however, an overload occurs in any one, or all, phases of the three-phase circuit, there will be a sufficient amount of current generated in heating coil 22 to cause the contacts 34 and 35 of the circuit controller to close, thereby to energize the trip coil 16 and open the switch 14.

The single thermal element, therefore, is responsive to abnormal conditions in any one, or all, phases of the multiphase circuit.

Figure 3:
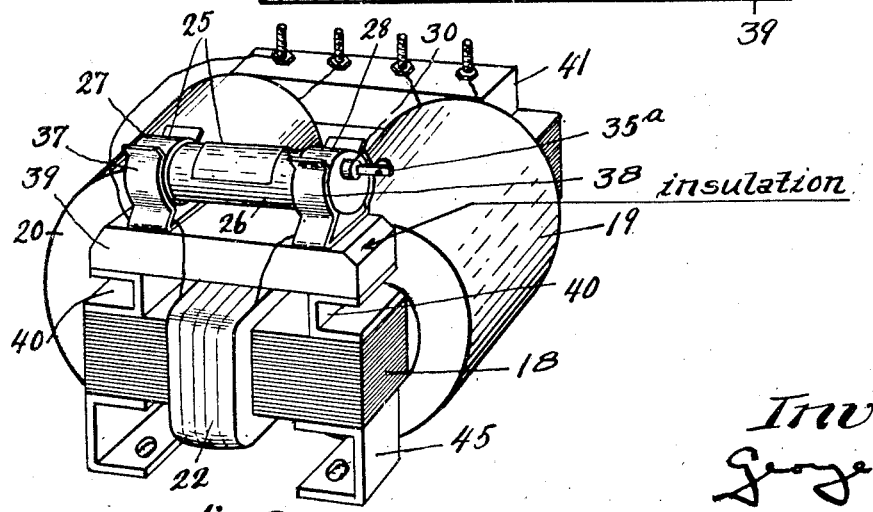
Fig. 3 is a perspective view of the protective apparatus embodying the invention.

I prefer to arrange the various components of the protective device in a unitary structure, as illustrated in Fig. 3, wherein the supporting base 39 of the circuit-controller is mounted directly on the core 18 of the transformer by the brackets 40. A junction block 41 may be supported on the opposite side of the transformer core and carry the terminal connections for the transformer coils. The device may be supported by suitable feet 45.

Figure 4:
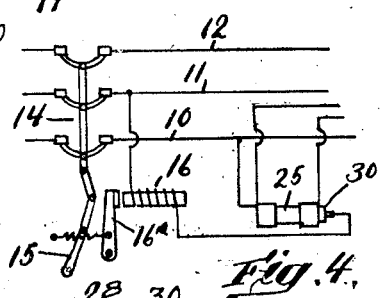
Fig. 4 is a diagrammatic detail illustrating a modified arrangement for opening the multi-phase switch.
Figure 2:
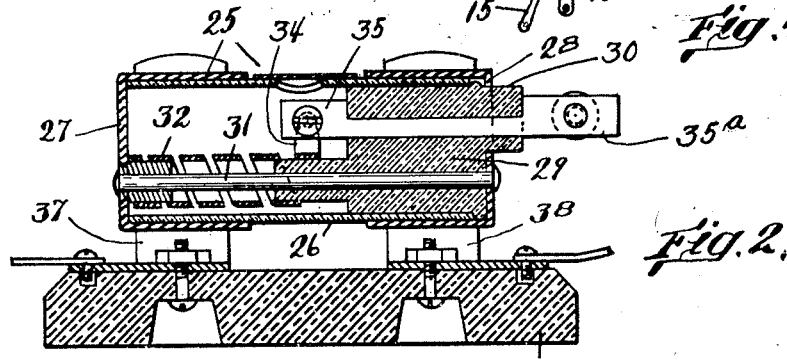
Fig. 2 is a longitudinal sectional elevation through the thermally-actuated device.

With the arrangement of apparatus illustrated in Fig. 1, the thermal element is adapted to close its contacts to open the switch 14. In Fig. 4 the arrangement is such that the thermal element is adapted to open its contacts to open the switch 14. In this figure, the trip coil 16 is adapted to be normally continually energized through the normally-closed contacts of the thermal element; and hold in attracted position an armature 16ª. When the contacts of the thermal element open upon overload, the armature 16ª is pulled back by the spring 16ᵇ and strikes a blow on the locking mechanism of the switch, thereby opening the switch. The idea of circuit-opening contacts in the thermal element is sometimes to be preferred over the circuit-closing contacts as less current need be controlled by the contacts.

I claim:

1. Multi-phase circuit-protective apparatus comprising a switch for the circuit, and controlling means for the switch including a single thermally-actuated device having a heating element energized by a single source of current derived from the currents in all of the phases of the circuit.

2. Multi-phase circuit-protective apparatus comprising a switch for the circuit, and controlling means for the switch including a thermally-expansible member arranged to be heated and effect the opening of the switch, and a single electric heating conductor for said expansible member traversed by a current derived from the currents in all of the phases of the circuit.

3. A multi-phase circuit protective apparatus including a circuit-controller having a thermally-actuated member, and means to actuate said member by the currents in different phases of the circuit including a heating conductor for said member, and a transformer having a plurality of primary windings which are energized by the currents in all of the phases of the multi-phase circuit, and a single secondary winding common to all of said primary windings and connected with said heating conductor.

4. A multi-phase circuit protective apparatus including a circuit-controller having a thermally-actuated member, and means to actuate said member by the currents in different phases of the circuit, said means including a heater element disposed in heating relation with said member, and means to heat said element by a current derived from all of the currents in the different phases of the circuit.

5. A multi-phase circuit protective apparatus including a circuit-controller having a thermally-actuated member, and means to actuate said member by a current derived from all of the currents in the different phases of the circuit, said means including a heater element disposed in heating relation with said member, and a transformer coil responsive to all of the currents in the different phases of the circuit connected with said heater element to supply heating current thereto.

6. A multi-phase circuit protective apparatus including a circuit-controller having a thermally-actuated member, and means to actuate said member by the currents in different phases of the circuit, said means including a heater element disposed in heating relation with said member, a transformer coil connected with said heater element to supply heating current thereto, and coils in different phases of the circuit each arranged independently and all also arranged conjointly to influence the current in said transformer coil.

7. Multi-phase circuit protective apparatus having a plurality of members adapted to be energized by the currents in the different phases of the circuit, and a single thermally-actuated circuit-controller arranged to be inductively influenced by the currents traversing all of said members.

8. Multi-phase circuit protective apparatus having a plurality of coils adapted to be energized by the currents in the different phases of the circuit, a heating coil arranged in the magnetic fields of all of the aforesaid coils to be influenced by the currents traversing all of said coils, and a single thermally-actuated circuit-controller arranged to be influenced by the current in said heating coil.

9. Multi-phase circuit protective apparatus having a plurality of coils adapted to be energized by the currents in the different phases of the circuit, a heating coil arranged in the magnetic fields of all of the aforesaid coils to be influenced by the currents traversing all of said coils, and a single thermally-actuated circuit-controller having thermally-actuated contact-members, and a heating device for said contact-members arranged to be influenced by the current in said heating coil.

10. A multi-phase circuit protective device having a magnetizable core, a plurality of windings thereon adapted to be energized by the currents in the different phases of the circuit, a heating coil carried by said core, and a single thermally-actuated circuit-controller arranged to be influenced by the current in said heating coil.

11. A three-phase circuit protective device comprising a rectangular magnetizable core, two circuit-windings on the opposite legs of the core, each winding adapted to be connected in a separate phase of the circuit, a heating coil on another leg of the core, a support for said core, a base carried by said support and having terminal members for said heating coil, and a thermally-actuated circuit-controller removably received in and supported by and connected electrically with said terminal members.

12. A three-phase circuit protective device comprising a rectangular magnetizable core, two circuit-windings on the opposite legs of the core, each winding adapted to be connected in a separate phase of the circuit, a heating coil on another leg of the core, a base disposed above and supported by said core, terminal members for said heating coil carried by said base, and a thermally-actuated circuit-controller received in and electrically connected with said terminal members.

In testimony whereof, I have signed my name to this specification.

GEORGE A. BURNHAM.